United States Patent
Nelson et al.

(10) Patent No.: US 6,811,733 B2
(45) Date of Patent: Nov. 2, 2004

(54) RESIN TRANSFER MOLDING MULTI-PART/SHIM TOOLING (RTM-MPST)

(75) Inventors: Karl M. Nelson, Seattle, WA (US); Thomas R. Cundiff, Edgewood, WA (US); Scott A. Miller, Des Moines, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/010,805

(22) Filed: Nov. 13, 2001

(65) Prior Publication Data

US 2003/0090025 A1 May 15, 2003

(51) Int. Cl.$^7$ .................. B28B 11/12; B29C 29/00; B29B 13/00

(52) U.S. Cl. .................. 264/157; 264/161; 264/241; 264/247; 264/251; 264/259; 264/261; 264/271.1

(58) Field of Search ................... 264/157, 161, 264/241, 247, 251, 259, 261, 271.1

(56) References Cited

U.S. PATENT DOCUMENTS

| 3,220,692 | A |   | 11/1965 | Eklund |
|---|---|---|---|---|
| 4,135,695 | A |   | 1/1979 | Capdevila et al. |
| 4,534,924 | A |   | 8/1985 | Kariakin |
| 4,817,515 | A |   | 4/1989 | Bjerre et al. |
| 5,542,837 | A |   | 8/1996 | Johnston |
| 5,595,692 | A | * | 1/1997 | Folsom et al. ............. 264/36.1 |
| 5,676,979 | A | * | 10/1997 | Folsom et al. ............. 425/13 |
| 5,824,249 | A |   | 10/1998 | Leitch et al. |

* cited by examiner

Primary Examiner—Stephen J. Lechert, Jr.
(74) Attorney, Agent, or Firm—Harness Dickey & Pierce P.L.C.

(57) ABSTRACT

A method for forming a plurality of composite parts via resin transfer molding in a single molding cycle. The method includes the steps of using a mold having first and second mold members that cooperate to house a plurality of shims and placing a plurality of preform workpiece into the mold cavity such that at least one of the shims is disposed between each of an adjacent pair of the preform workpieces. A liquid resin is then injected into the mold cavity and subsequently cured to thereby form a cured workpiece matrix that is composed of a plurality of semi-finished composite parts and at least one shim separating the plurality of semi-finished composite parts from one another.

8 Claims, 2 Drawing Sheets

RESIN TRANSFER MOLDING MULTI-PART/SHIM TOOLING (RTM-MPST)

FIELD OF THE INVENTION

The present invention relates generally to a closed molding process that produces cured composite parts, and more particularly, to a method for producing multiple composite parts via resin transfer molding in a single cycle.

BACKGROUND OF THE INVENTION

Resin Transfer Molding (RTM) is a process that uses a closed mold to produce cured composite parts. A dry fabric preform is placed in the mold cavity, the mold is closed and a resin in injected into the mold. The mold is exposed to an elevated curing temperature, and after a predetermined curing cycle has elapsed, a finished part is removed from the mold. The part is then ready for final trim.

Prior RTM processes are only capable of producing one composite part for each cycle. Therefore, after each cycle the RTM molding tool must be cleaned or reprocessed for the next injection.

Another disadvantage of the known RTM processes is the cost of low-tolerance tooling Typical aerospace applications for RTM, for example, will require a part to be formed to a predetermined thickness within about ±0.025 mm (±0.001 in.). As those skilled in the art will readily understand, the fabrication of the tooling having this capability is relatively expensive, often costing 20–35% more than similar tooling having more open tolerances.

Accordingly, there remains a need in the art for an RTM tool and method that is capable of producing a plurality of highly consistent molded parts in a single molding cycle that overcomes the aforementioned drawbacks.

SUMMARY OF THE INVENTION

The Resin Transfer Molding Multi-Part/Shim Tooling (RTM-MPST) process overcomes this disadvantage by injecting resin into the mold cavity thus flooding multiple parts and shims, the pressure is distributed hydrostatically (evenly in all directions). This distributes the tolerance across each of the parts and with more shims in the cavity, the closer the parts will be to nominal thickness in a cost effective manner.

In one preferred form, the present invention provides a method for forming a plurality of composite parts via resin transfer molding in a single molding cycle. The method includes the steps of providing a mold having first and second mold members that cooperate to define a mold cavity; providing a plurality of shims; loading a plurality of preform workpieces into the mold cavity such that at least one of the shims is disposed between each of an adjacent pair of the preform workpieces; injecting a liquid resin into the mold cavity; curing the liquid resin to thereby form a cured workpiece matrix that is composed of a plurality of semi-finished composite parts and the at least one shim; and separating the plurality of semi-finished composite parts and the at least one shim from one another.

In another preferred form, the present invention provides a mold apparatus for performing a resin transfer molding operation on a plurality of preform workpieces to substantially simultaneously mold a plurality of semi-finished composite parts in a single molding cycle. The mold apparatus includes a first mold member, which defines a first mold line, a second mold member, which defines a second mold line, and at least one shim. The second mold member cooperates with the first mold member to define a mold cavity that is bounded by the first and second mold lines. The shim(s) are sized to fit within the mold cavity and are configured to be spaced in relation to the first and second mold lines to thereby segregate the mold cavity into a plurality of sub-cavities. Each of the sub-cavities is configured to house one of the perform workpieces. With the present invention, (RTM-MPST) produces multiple composite parts in one cycle thereby reducing the frequency that the tool is reprocessed and reduces resin waste.

BRIEF DESCRIPTION OF THE DRAWINGS

Additional advantages and features of the present invention will become apparent from the subsequent description and the appended claims, taken in conjunction with the accompanying drawings, wherein:

DETAILED DESCRIPTION OF THE PREFERRED EMBODIMENTS

Figure 1:
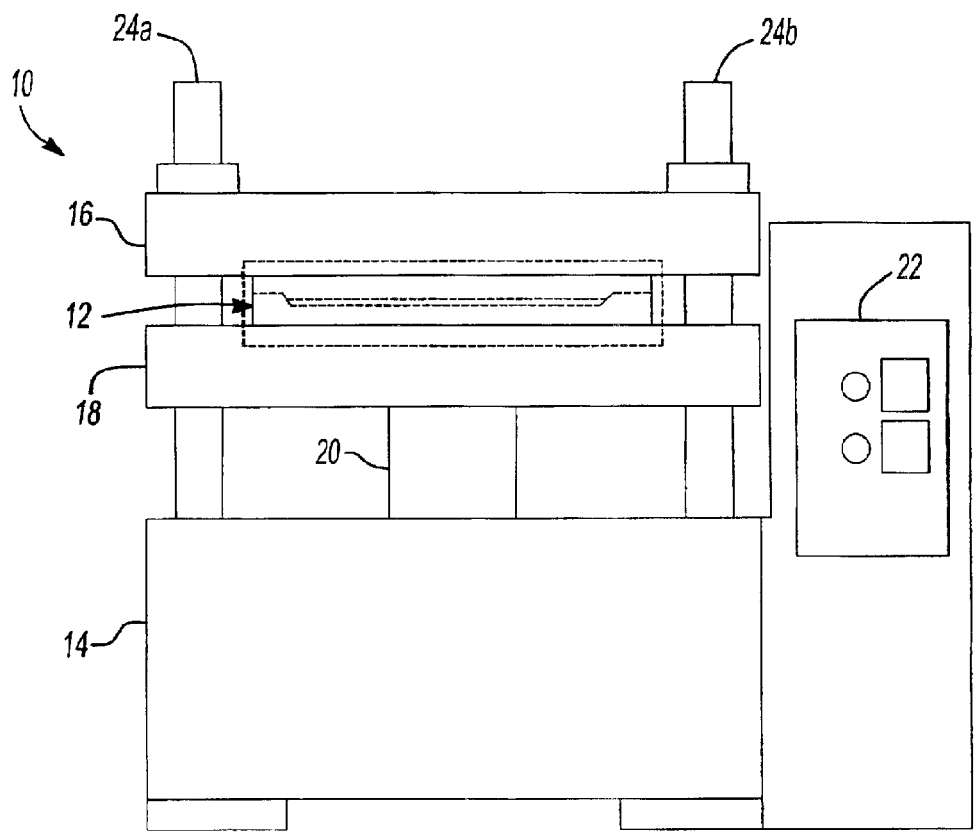
FIG. 1 is a side elevation view of a molding apparatus constructed in accordance with the teachings of the present invention.

With reference to FIG. 1 of the drawings, a molding apparatus 10 is illustrated to include a mold assembly 12 that is constructed in accordance with the teachings of the present invention. The molding apparatus 10 is also illustrated to include a base 14, an upper platten 16, a lower platten 18, a ram 20, a control unit 22 a plurality of upright guides 24a, 24b and a mold assembly 12. The base 14, the upper and lower plattens 16 and 18, the ram 20, the control unit 22 and the upright guides 24a, 24b comprise a conventional molding press 10 of the type that is suited for resin transfer molding. Since such presses are well known in the art and as such, a detailed discussion of their construction and operation need not be provided herein. Briefly, in the example provided, the upright guides 24a, 24b are coupled to the base 14 and serve to fix the upper platten 16 in a predetermined spaced relation from the base 14. The ram 20 is illustrated to be coupled to both the base 14 and the lower platten 18. The ram 20 is conventionally hydraulically actuated via a hydraulic power source (not shown) to permit the lower platten 18 to be raised and lowered relative to the upper platten 16 in a desired manner. The upright guides 24a, 24b conventionally guide the lower platten 18 as it is being raised and lowered. The control unit 22 is coupled to and operable for controlling the source of hydraulic power and the heating elements (not shown) within each of the upper and lower plattens 16 and 18. The control unit 22 may be configured to control the source of hydraulic power such that the ram 20 positions the lower platten 18 at a predetermined distance from the upper platten 16, or may be simply configured to exert a predetermined force or pressure onto the upper and lower plattens 16 and 18. When actuated by the control unit 22, the heating elements generate heat that is transmitted through the upper and lower plattens 16 and 18 to the mold assembly 12.

Figure 2:
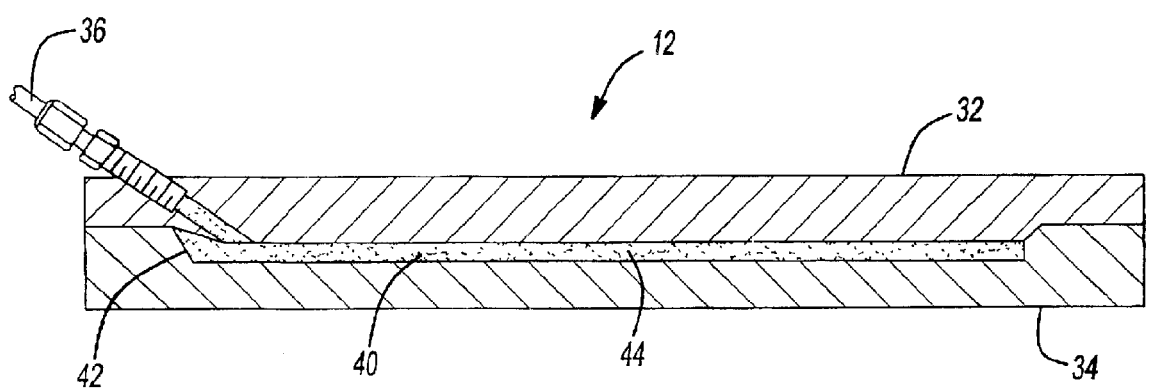
FIG. 2 is a sectional view of a portion of the molding apparatus of FIG. 1 illustrating the mold assembly in greater detail.

With additional reference to FIG. 2, the mold assembly 12 includes a first mold member 32, a second mold member 34, a resin inlet conduit 36, a resin outlet conduit (not shown) and at least one shim member 40. The first and second mold members 32 and 34 are illustrated to define a mold cavity 42 having a predetermined size and thickness. The resin inlet 36 provides a means for facilitating the introduction of a liquid resin into the mold cavity 42, while the resin outlet provides a means for facilitating the evacuation of air from the mold cavity 42.

The shims 40 are disposed within the mold cavity 42 and operably segregate the mold cavity 42 into a plurality of sub-cavities 44. The shims 40 are preferably "free-floating" within the mold cavity 42 and as such, are formed to a size (e.g., length and width) that are relatively smaller than the size of the mold cavity 42. In the example provided, the shims 40 are perishable, being disposed of after one or more molding cycles. The quantity of shims 40 in the mold cavity 42, as well as their thickness, are dependant upon several factors, which may include, for example, the actual depth of the mold cavity, the quantity of composite parts that are to be formed in a single molding cycle and the thickness tolerance of the finished composite parts.

In the particular example provide, the finished composite parts that are to be formed in the mold assembly 12 are substantially flat panels having a thickness tolerance of about +/−0.0254 mm (+/−0.001 inch). As noted above, the fabrication of tooling that would reliably and repeatably meet this thickness tolerance is extremely expensive, whereas tooling having "standard", more open tolerances, e.g., ±0.127 mm (±0.005 inch), often costs as much as 35% less. As, in the example provided, both improved processing efficiency and reduced tooling costs are desirable, a decision is made prior to the construction of the mold assembly 12 as to what tolerances are to be used with regard to the overall depth of the mold cavity 42. For illustrative purposes, the example provided herein will assume a tolerance of ±127 mm (±0.005 inch) with regard to the overall depth of the mold cavity 42; this tolerance will hereinafter be referred to as the mold cavity tolerance.

It should be noted that the mold cavity tolerance exceeds the thickness tolerance for the finished composite parts, i.e., ±0.0254 mm (±0.001 inch). The segregation of the mold cavity 42 by the shims 40 into a plurality of sub-cavities 44, however, permits the mold cavity tolerance to be substantially equally distributed to each of the sub-cavities 44. With the mold cavity tolerance (MCT) and the thickness tolerance (TT) of the finished composite parts being known quantities, the quantity (Q) of finished composite parts that are to be formed in a single molding cycle is determined from the equation:

$$Q \geq (MCT \div TT).$$

Accordingly, the mold cavity 42 must be sized for a minimum quantity of five (5) sub-cavities 44 to ensure that each composite part that is formed in the mold assembly 12 meets the desired thickness tolerance. As those skilled in the art will understand, the mold cavity 42 may, of course, be sized for a greater quantity of sub-cavities 44 to thereby achieve improved processing efficiency and improved process capability.

With concerns for tolerances, processing efficiency and process capability being accounted for when determining the number of sub-cavities 44 that are to be formed within the mold cavity 42, the overall depth of the mold cavity 42 is then determined. This is determined with reference to the number of finished composite parts that are to be formed in a single molding cycle (i.e., the number of sub-cavities 44), the nominal thickness of each of the finished composite parts, and the nominal thickness of the shims 40 that form the sub-cavities 44.

Figure 3:
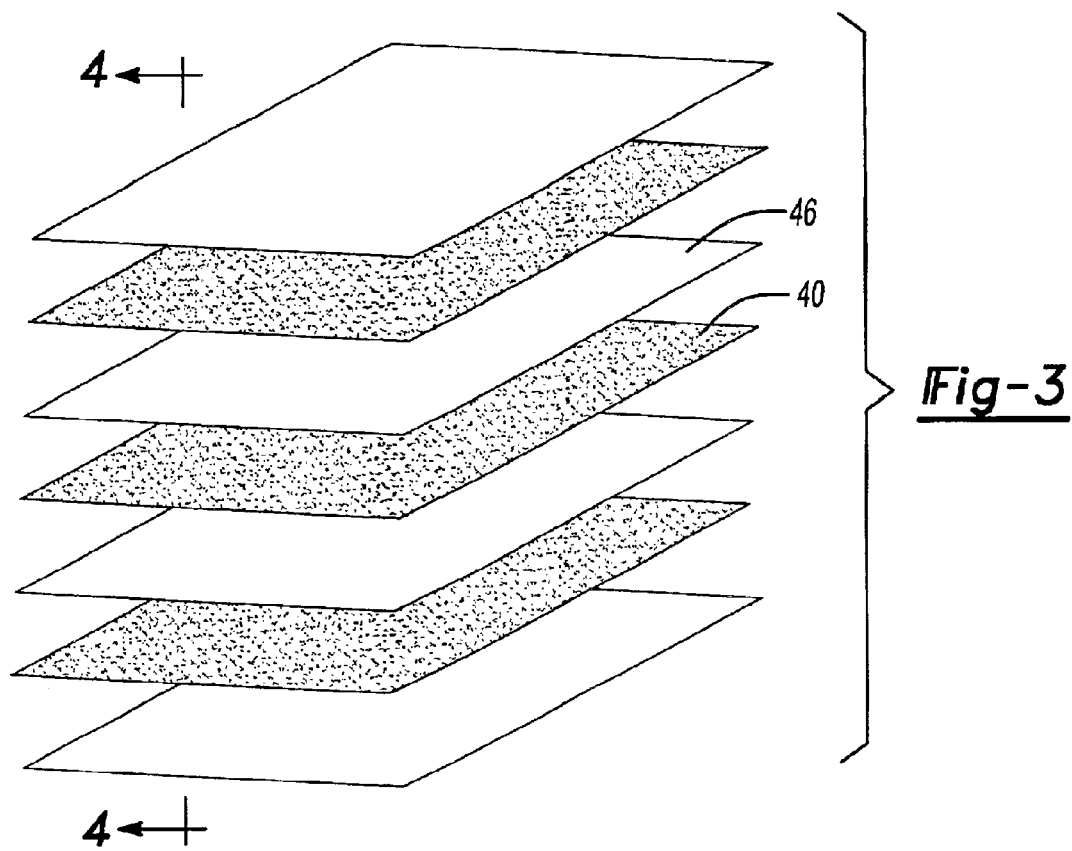
FIG. 3 is an exploded perspective view illustrating the arrangement of the composite preforms and shims as they would be loaded into the mold cavity prior to the injection of a liquid resin.

The mold assembly 12 thus formed is loaded with the shims 40 and a plurality of composite preform workpieces 46 as shown in FIG. 3.

After the preforms and shims are loaded into the mold cavity, the mold members are closed and a liquid resin is injected into the mold cavity via the resin inlet conduit. The liquid resin is pressurized to a predetermined pressure. As the resin outlet conduit permits air within the mold cavity to escape, a pressure differential across the mold cavity is generated, permitting the liquid resin to fully infiltrate and surround each of the sub-cavities, thereby coating and/or penetrating each of the composite preform workpieces with resin.

Once the air has been completely evacuated from the mold cavity and resin is exiting the mold assembly from the resin outlet conduit, the supply of liquid resin to the mold assembly is halted and the heating elements within the upper and lower plattens are actuated by the control unit to heat the mold assembly and cure the resin within the mold cavity.

Figure 4:
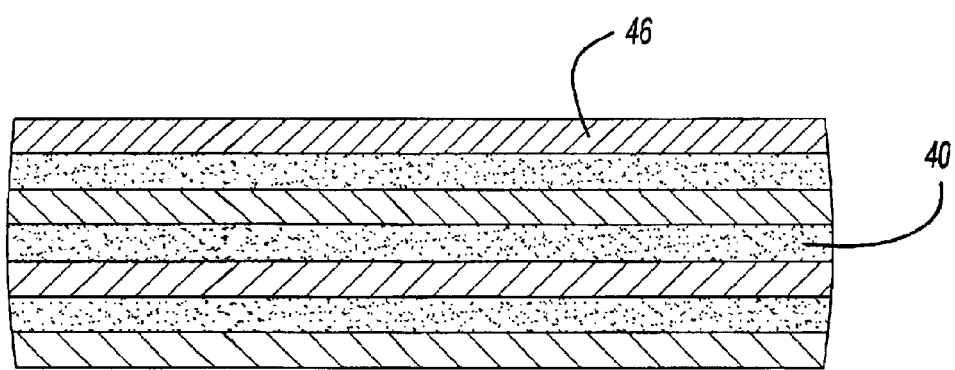
FIG. 4 is an exploded perspective view illustrating the semi-finished composite parts and shims as separated from one another after their removal from the mold cavity.

When the resin within the mold cavity has cured sufficiently after the mold assembly's exposure to a predetermined elevated temperature and the elapse of a predetermined amount of time, the mold assembly is opened and a cured workpiece matrix 50 is removed from the mold cavity, as shown in FIG. 4.

While the finished composite parts that are formed via the single molding cycle of the present invention are described herein as being substantially flat panels, those skilled in the art will understand that composite parts having other contours may also be molded. For example, the construction of a panel that conforms to a spherical radius may be readily undertaken assuming, of course, that the tolerance on the radius is sufficiently large to permit the deviations that would occur from the successive layering of one or more shims and composite preform workpieces onto the lower mold member. In this regard, it is preferable to form the lower mold member such that it will form the semi-finished composite part that contacts it to a radius that is at or just slightly greater than the minimum spherical radius to which the panels are to be formed. Construction of the mold assembly in this manner permits the maximization of the number of spherical panels that are formed in the single molding cycle. Those skilled in the art will understand that the contour of the upper mold member will be different from that of the lower mold member, as the radius to which it is formed is greater than that for the lower mold member by an amount that is related to the number of shims and composite preform workpieces that are disposed between the upper and lower mold members.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the foregoing description and the appended claims.

What is claimed is:

1. A method for forming a plurality of composite parts via resin transfer molding in a single molding cycle, the method comprising the steps of:
   providing a mold having first and second mold members that cooperate to define a mold cavity;
   providing a plurality of shims;
   loading a plurality of preform workpieces into the mold cavity such that at least one of the shims is disposed between each of an adjacent pair of the preform workpieces;
   injecting a liquid resin into the mold cavity;
   curing the liquid resin to thereby form a cured workpiece matrix that is composed of a plurality of semi-finished composite parts and the at least one shim; and
   separating the plurality of semi-finished composite parts and at least one shim from one another.

2. The method of claim 1, wherein the step of separating comprises the step of trimming the sides of the cured workpiece matrix such that none of the semi-finished composite parts are bonded to one another.

3. The method of claim 1, wherein a quantity of the preform workpieces that are loaded into the mold cavity is related to a predetermined thickness tolerance for the composite parts.

4. The method of claim 3, wherein the quantity of the preform workpieces that are loaded into the mold cavity is further related to a predetermined mold cavity tolerance.

5. The method of claim 4, wherein the quantity (Q) of the preform workpieces that are loaded into the mold cavity, the thickness tolerance (TT) for the composite parts and the mold cavity tolerance (MCT) are related by the equation $Q \geq (MCT \div TT)$.

6. The method of claim 1, wherein each of the composite parts is a substantially flat panel.

7. The method of claim 1, further comprising the step of processing the semi-finished composite parts through at least one machining operation to form a plurality of finished composite parts.

8. The method of claim 7, wherein the at least one machining operation includes a trimming operation wherein the semi-finished composite parts are trimmed to a predetermined size.

* * * * *